United States Patent
Lu

(10) Patent No.: US 6,671,929 B1
(45) Date of Patent: Jan. 6, 2004

(54) HINGE FOR A NOTEBOOK COMPUTER

(75) Inventor: Sheng-Nan Lu, Taipei Hsien (TW)

(73) Assignee: Shin Zu Shing Co., Ltd. (TW)

( * ) Notice: Subject to any disclaimer, the term of this patent is extended or adjusted under 35 U.S.C. 154(b) by 0 days.

(21) Appl. No.: 10/242,940

(22) Filed: Sep. 13, 2002

(51) Int. Cl.$^7$ .............................. E05D 11/08; E05F 1/14
(52) U.S. Cl. .............................. 16/342; 16/285; 16/307; 16/374
(58) Field of Search ........................... 16/277, 280, 285, 16/307, 308, 306, 374, 342, 293, 295; 361/680–683; 403/119, 120, 111, 116, 84

(56) References Cited

U.S. PATENT DOCUMENTS

| | | | | |
|---|---|---|---|---|
| 99,453 A | * | 2/1870 | McAdams | 16/307 |
| 765,372 A | * | 7/1904 | Bading | 16/285 |
| 1,063,136 A | * | 5/1913 | Palmer | 16/307 |
| 1,384,260 A | * | 7/1921 | Kanter | 16/307 |
| 5,028,913 A | * | 7/1991 | Kitamura | 361/681 |
| 5,040,268 A | * | 8/1991 | Knurr | 16/261 |
| 5,207,316 A | * | 5/1993 | Sakamoto | 200/47 |
| 5,566,048 A | * | 10/1996 | Esterberg et al. | 361/681 |
| 5,749,124 A | * | 5/1998 | Lu | 16/307 |
| 5,771,539 A | * | 6/1998 | Wahlstedt et al. | 16/285 |

FOREIGN PATENT DOCUMENTS

| | | | |
|---|---|---|---|
| JP | 8-193616 | * | 7/1996 |
| JP | 2000-66762 A | * | 3/2000 |
| JP | 2001-49939 A | * | 2/2001 |
| JP | 2001-65543 A | * | 3/2001 |
| WO | WO 95/16094 | * | 6/1995 |

* cited by examiner

Primary Examiner—Chuck Y. Mah
(74) Attorney, Agent, or Firm—Thorp Reed & Armstrong LLP

(57) ABSTRACT

A hinge for a notebook computer is composed of a pintle, a resilient sleeve, and two barrels. The first barrel is provided outside the first part of the pintle, and the second barrel is provided outside the second part of the pintle. The resilient sleeve is provided outside a middle part of the pintle between the barrels. The resilient sleeve has an elongated opening longitudinally defined therethrough, and two protrusions formed at two ends thereof. The barrels each have a lug abutting the respective protrusion. When the computer is closed, the resilient sleeve is compressed to provide an elastic force to raise the monitor from the body of the computer.

5 Claims, 10 Drawing Sheets

HINGE FOR A NOTEBOOK COMPUTER

BACKGROUND OF THE INVENTION

1. Field of the Invention

The present invention is related to a hinge for a notebook computer, and more particularly to a hinge which has an elastic force to automatically open the notebook computer.

2. Description of Related Art

Referring to FIGS. 9 and 10, a conventional hinge used for a notebook computer is composed of a pintle (61) and an L-shaped bracket (60). The bracket (60) is mounted in a body of the notebook computer and the pintle (61) is mounted in a monitor.

The pintle (61) extends through the bracket (60) from an exterior side to the interior side. Two pairs of washers (62) are respectively provided at the interior side and the exterior side of the bracket (60). A nut (66) is engaged with the distal end of the pintle (61) to fasten the pintle on the bracket (60). An oil disk (63), a plurality of resilient dished washers (64) and a positioning disk (65) are in turn provided between the interior pair of washers (62) and the nut (66). The oil disk (63) has patterns formed on outer surface thereof for maintaining lubrication. The resilient dished washers (64) are used for increasing friction. By using the hinge, the monitor can be pivoted about the body of the computer.

However, the conventional hinge does not provide an elastic force to slightly open the monitor when a user wants to open the computer, and the user may fumble in trying to separate the two hinged portions.

Therefore, the invention provides a hinge for a notebook computer to mitigate and/or obviate the aforementioned problems.

SUMMARY OF THE INVENTION

The main objective of the invention is to provide a hinge for a notebook computer which can provide an elastic force to slightly open a monitor when a locking member of the computer is released.

Other objects, advantages and novel features of the invention will become more apparent from the following detailed description when taken in conjunction with the accompanying drawings.

DETAILED DESCRIPTION OF THE PREFERRED EMBODIMENT

Figure 1:
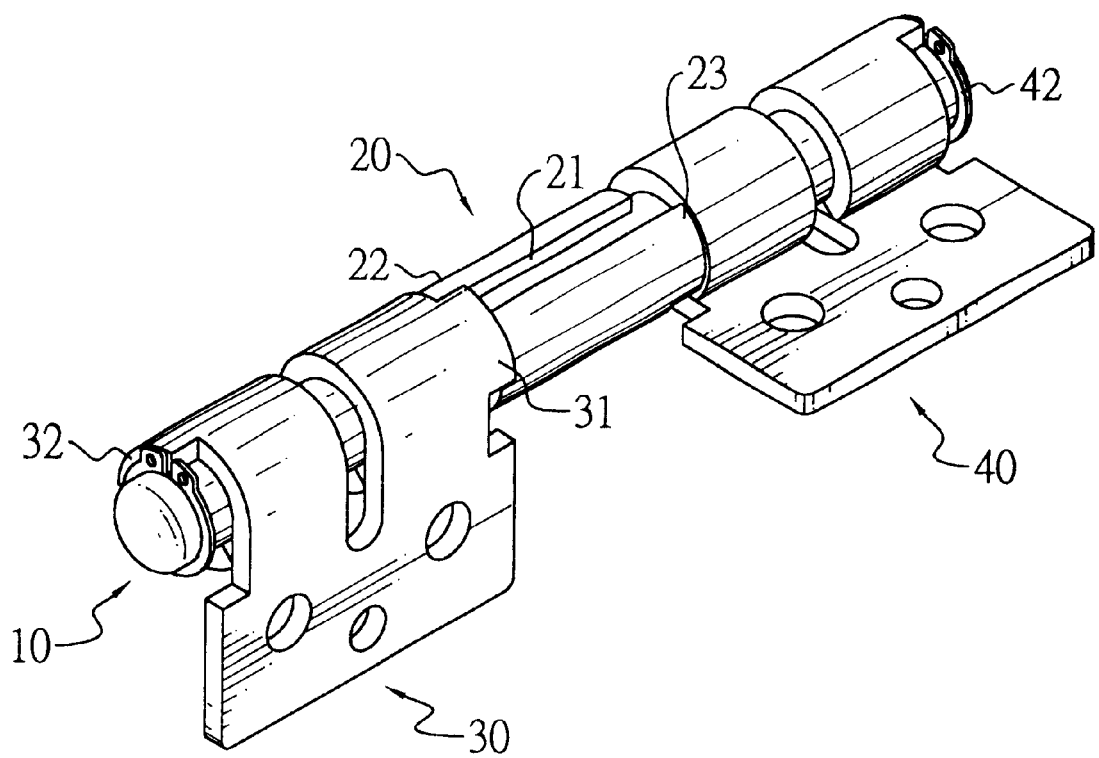
FIG. 1 is a perspective view of a hinge in accordance with the invention.
Figure 2:
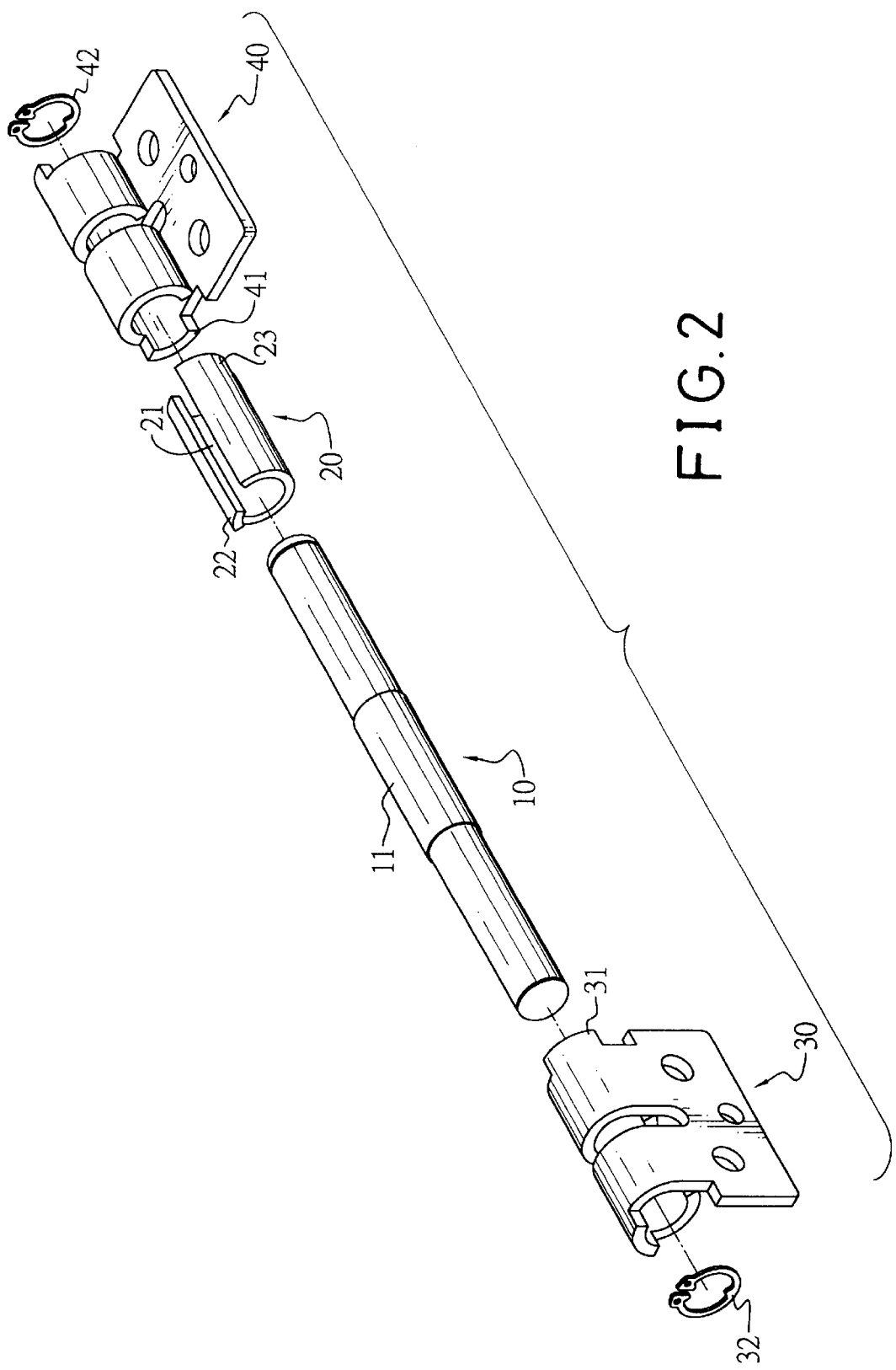
FIG. 2 is an exploded perspective view of the hinge in FIG. 1.
Figure 3:
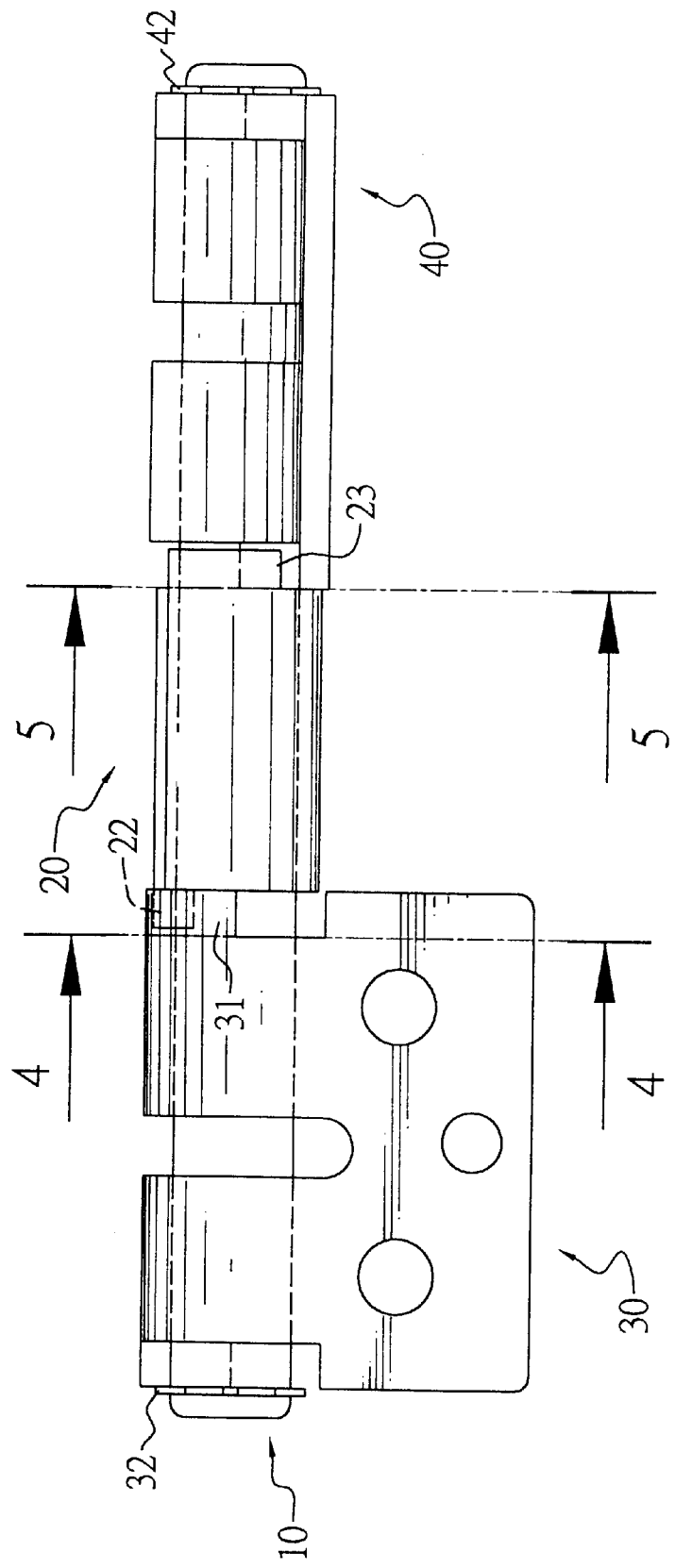
FIG. 3 is a front view of the hinge in FIG. 1.

Referring to FIGS. 1–3, a hinge for a notebook computer in accordance with the invention is composed of a pintle (10), a resilient sleeve (20), two barrels (30, 40) and two collars (32, 42).

The pintle (10) has a first part, a second part and a middle part (11) between the first part and the second part with a diameter larger than that of the first and second parts. Two round slots (not numbered) are respectively and circumferentially defined at two ends of the pintle (10).

The resilient sleeve (20) is mounted outside the middle part (11), and has an elongated opening (21) longitudinally defined therethrough to form a C-like cross section. Two protrusions (22, 23) are respectively formed at two ends of the resilient sleeve (20) and at two sides of the elongated opening (21).

The first barrel (30) is provided outside the first part of the pintle (10) and has a first lug (31) formed at an end facing the resilient sleeve (20) abutting the first protrusion (22). The first collar (32) is attached in the round slot on the first part to secure the first barrel (30).

The second barrel (40) is provided outside the second part of the pintle (10) and has a second lug (41) formed at an end facing the resilient sleeve (20) abutting the second protrusion (23). The second collar (42) is attached in the round slot on the second part to secure the second barrel (40).

Figure 4:
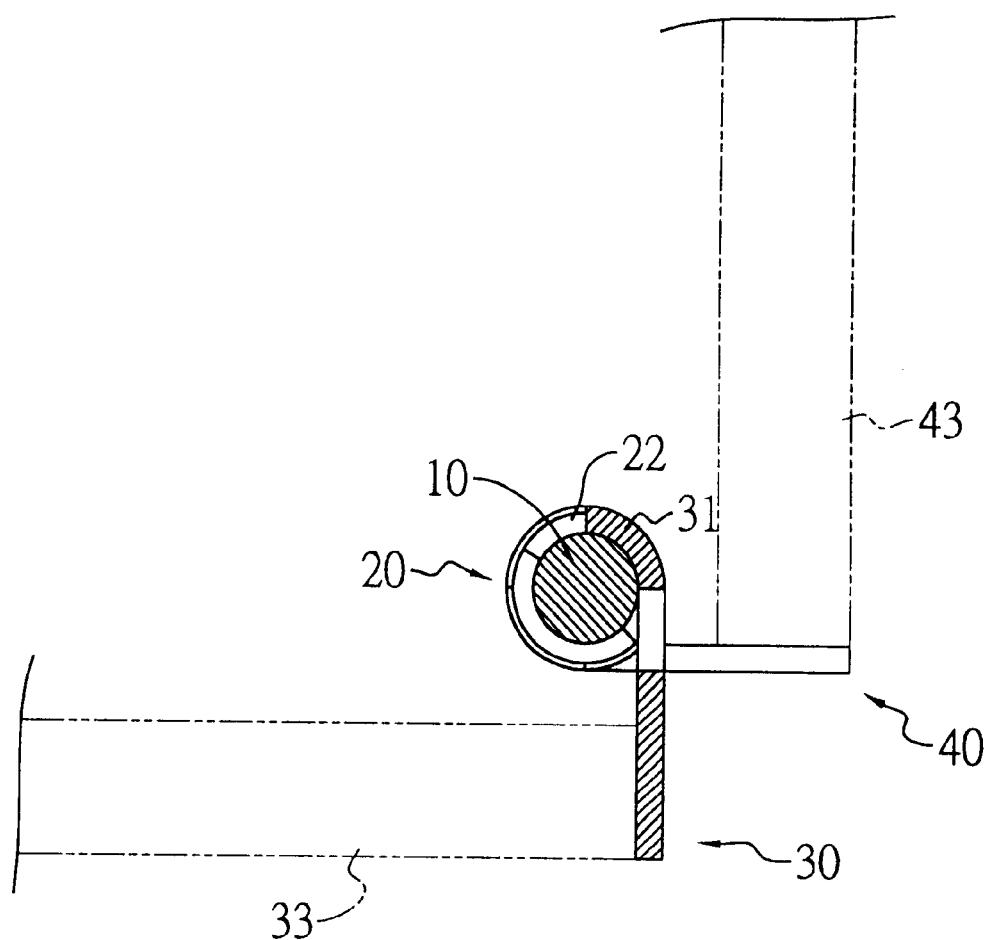
FIG. 4 is a cross-sectional view of the hinge along the line "4—4" in FIG. 3.
Figure 5:
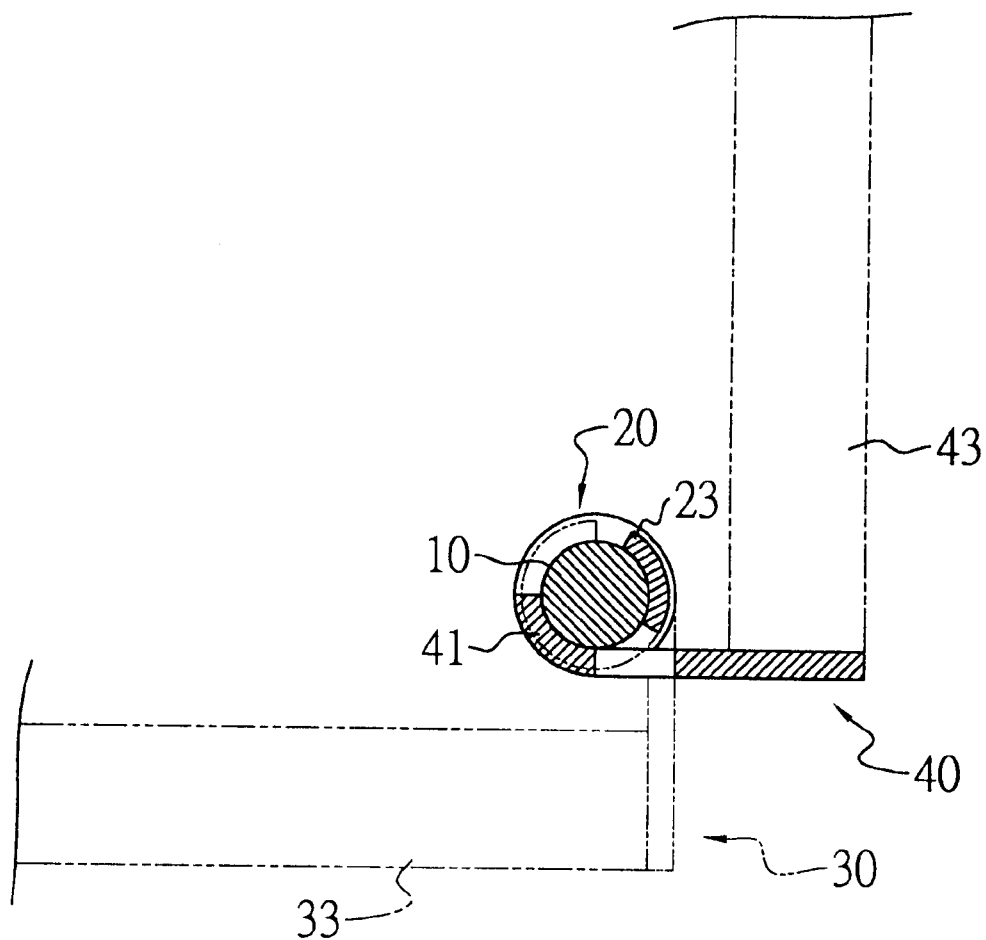
FIG. 5 is a cross-sectional view of the hinge along the line "5—5" in FIG. 3.

Referring to FIGS. 4–5, the first barrel (30) has a first plate extending therefrom and fastened on a body (33) of the computer, and the second barrel (40) has a second plate extending therefrom and fastened on a monitor (43) of the computer. Therefore, the monitor (43) can be pivoted about the body (33) by using the hinge.

Figure 6:
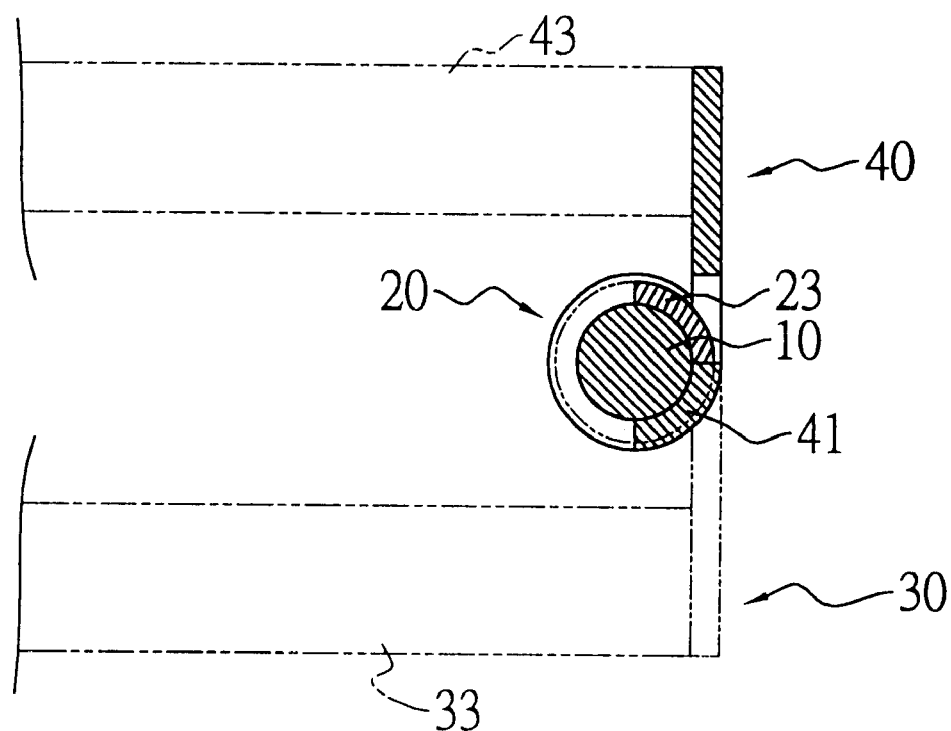
FIG. 6 is a cross-sectional view of the hinge in a closed status.

Referring to FIG. 6, when the monitor (43) is brought down to abut the body (33), the second lug (41) presses against the second protrusion (23) to compress the resilient sleeve (20) towards the elongated opening (21). When a user releases a locking member (not shown or numbered) to raise the monitor (43), the elastic force of the compressed resilient sleeve (20) can slightly push the monitor (41) to pivot upwards, so that the user can easily and conveniently raise the monitor (43).

Figure 7:
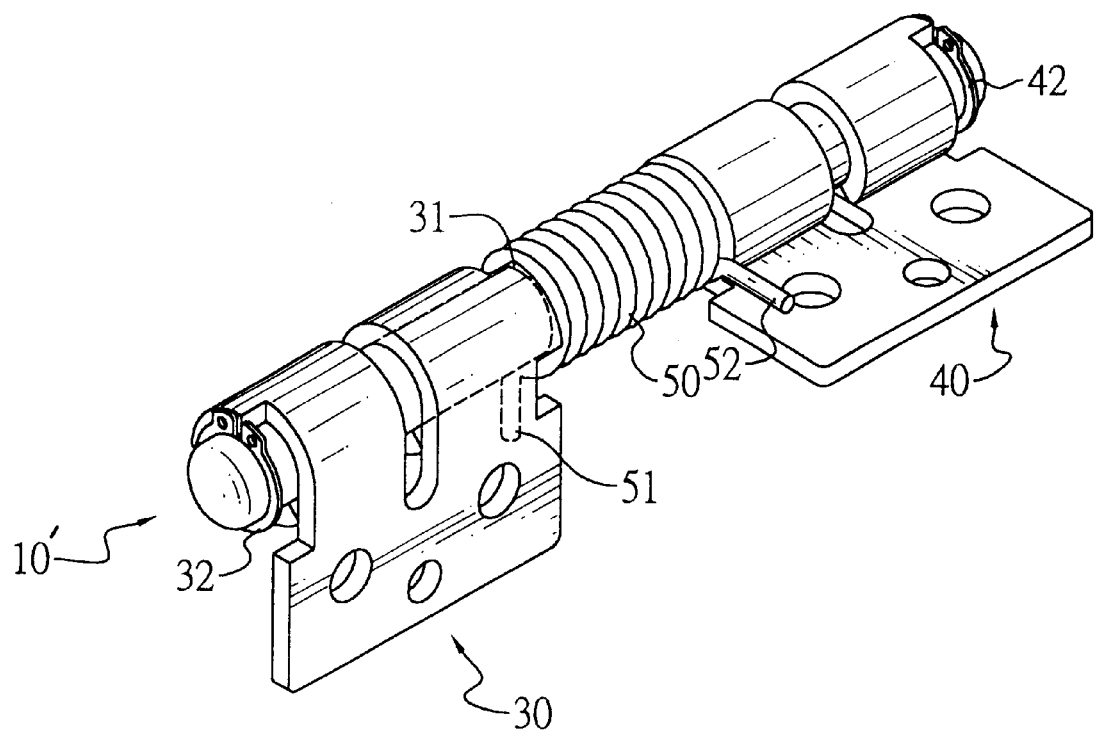
FIG. 7 is a perspective view of another embodiment of the hinge in accordance with the invention.
Figure 8:
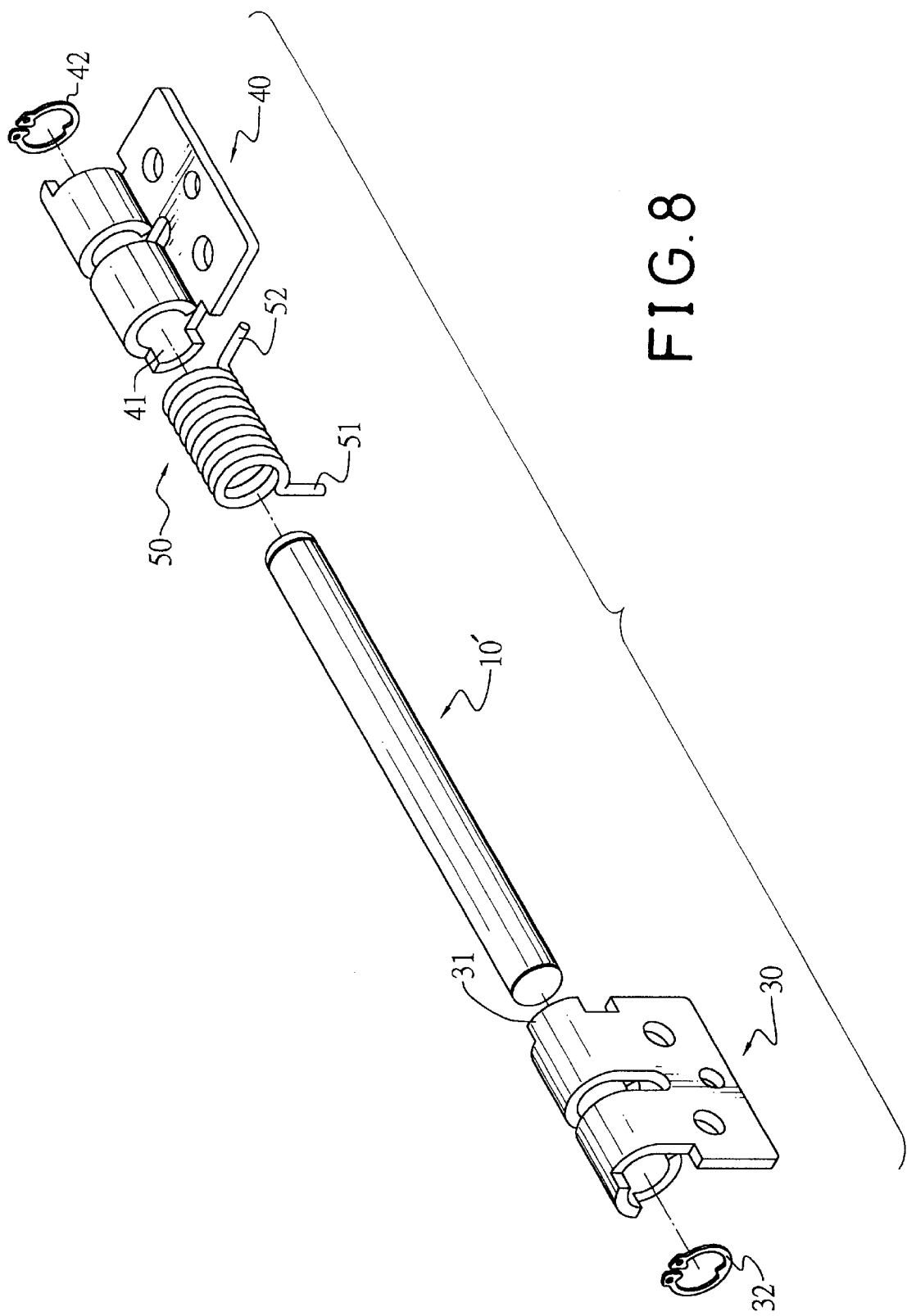
FIG. 8 is an exploded perspective view of the embodiment of the hinge in FIG. 7.
Figure 9:
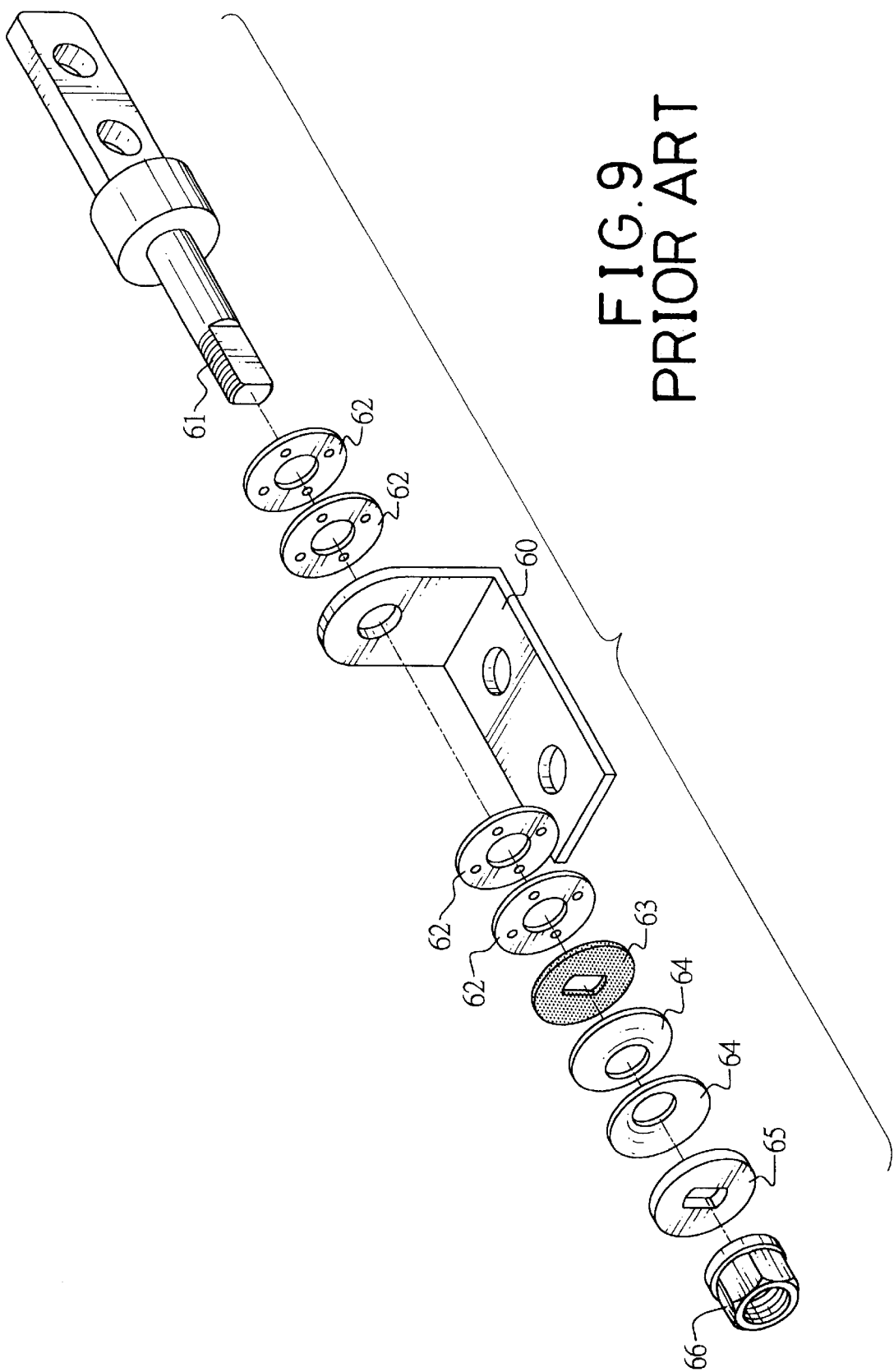
FIG. 9 is an exploded perspective view of a conventional hinge.
Figure 10:
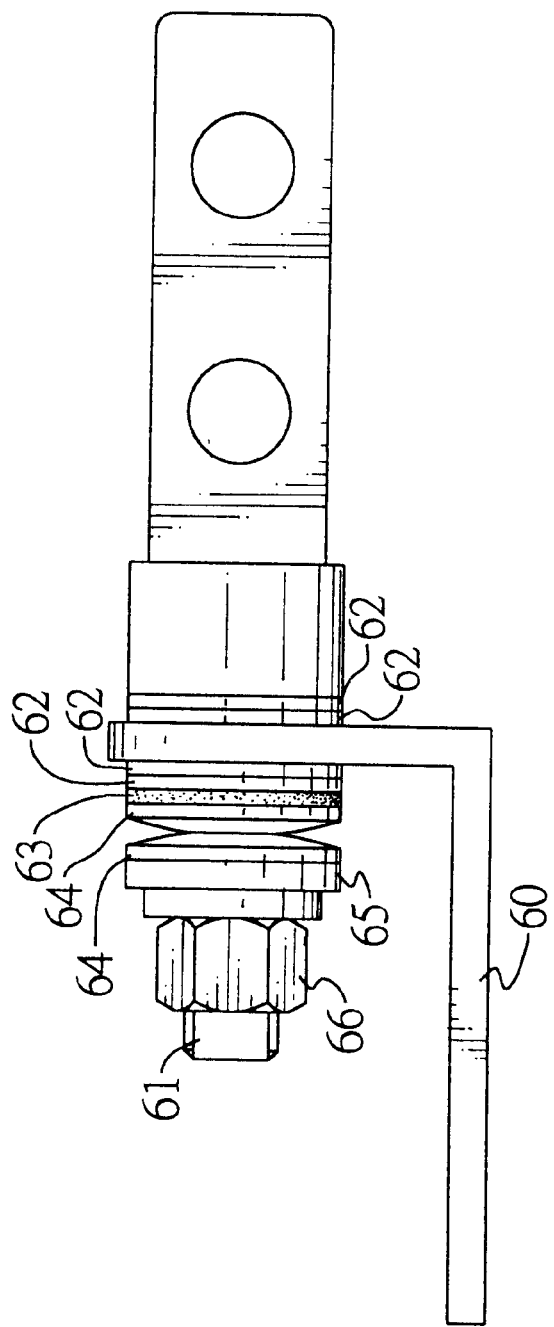
FIG. 10 is a front view of the conventional hinge in FIG. 9.

With reference to FIGS. 7 and 8, in another embodiment of the invention, the hinge has a pintle (10'). The middle part (not numbered) of the pintle (10') has a diameter the same as that of the first part and the second part. A torsional spring (50) is provided outside the middle part of the pintle (10'), and has two fingers (51, 52) respectively formed at two ends thereof. The first finger (51) presses against the first lug (31), and the second finger (52) presses against the second lug (41). When the monitor (43) abuts the body (33), the second lug (41) presses against the second finger (52) to compress the torsional spring (50). When the locking member is released, the elastic force of the compressed torsional spring (50) can slightly push the monitor (41) to pivot upwards, so that the user can easily and conveniently open the computer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer, the hinge comprising:

a pintle (10) with a first part, a second part, and a middle part between the first part and the second part;

a resilient sleeve (20) provided around the middle part of the pintle (10), the resilient sleeve (20) having an elongated opening (21) longitudinally defined through the sleeve (20), two protrusions (22, 23) respectively formed at two ends of the sleeve (20) and at two sides of the elongated opening (21);

a first barrel (30) provided around the first part of the pintle (10), the first barrel (30) having a first lug (31) formed at an end facing the resilient sleeve (20) and abutting the first protrusion (22); and a second barrel (40) provided around the second part of the pintle (10), the second barrel (40) having a second lug (41) formed at an end facing the resilient sleeve (20) and abutting the second protrusion (23).

2. The hinge as claimed in claim 1, wherein the middle part of the pintle (10) has a diameter larger than a diameter of the first part and the second part.

3. The hinge as claimed in claim 1, wherein the pintle (10) has two round slots respectively and circumferentially defined at two ends thereof, and two collars (32, 42) are respectively attached in the round slots to secure the first barrel (30) and the second barrel (40).

4. A hinge for a notebook computer, the hinge comprising:

a pintle (10') with a first part, a second part, and a middle part between the first part and the second part;

a torsional spring (50) provided around the middle part of the pintle (10), the torsional spring (50) having two fingers (51, 52) respectively formed at two ends of the torsional spring (50);

a first barrel (30) provided around the first part of the pintle (10), the first barrel (30) having a first lug (31) formed at an end facing the torsional spring (50) and abutting the first finger (51); and a second barrel (40) provided around the second part of the pintle (10), the second barrel (40) having a second lug (41) formed at an end facing the torsional spring (50) and abutting the second finger (52).

5. The hinge as claimed in claim 4, wherein the pintle (10') has two round slots respectively and circumferentially defined at two ends thereof, and two collars (32, 42) are respectively attached in the round slots to secure the first barrel (30) and the second barrel (40).

* * * * *